United States Patent [19]
Kirmsse et al.

[11] Patent Number: 5,192,845
[45] Date of Patent: Mar. 9, 1993

[54] PROCESS AND DEVICE FOR AUTOMATIC DETERMINATION OF PARAMETERS FOR PROCESS CONTROL SYSTEMS WITH UNKNOWN TRANSFER BEHAVIOR, IN PARTICULAR FOR PROCESS CONTROL SYSTEMS FOR RESISTANCE SPOT WELDING

[75] Inventors: Helmut Kirmsse; Ludger Wesselmann, both of Berlin, Fed. Rep. of Germany

[73] Assignee: Innovationsgesellschaft für Fortgeschrittene-Produktionssysteme in der Fahrzeugindustrie mbH, Berlin, Fed. Rep. of Germany

[21] Appl. No.: 721,425

[22] PCT Filed: Oct. 21, 1990

[86] PCT No.: PCT/DE90/00803
§ 371 Date: Jul. 26, 1991
§ 102(e) Date: Jul. 26, 1991

[87] PCT Pub. No.: WO91/06392
PCT Pub. Date: May 16, 1991

[30] Foreign Application Priority Data
Oct. 27, 1989 [DE] Fed. Rep. of Germany ....... 3936329

[51] Int. Cl.$^5$ ............................................. B23K 11/24
[52] U.S. Cl. .................................................. 219/110
[58] Field of Search ................. 219/109, 110; 364/477

[56] References Cited
U.S. PATENT DOCUMENTS
3,546,421 12/1970 Meyer et al. .................. 219/110
4,596,917 6/1986 Nied et al. ..................... 219/109

FOREIGN PATENT DOCUMENTS
3711771 10/1988 Fed. Rep. of Germany.
3743892 12/1988 Fed. Rep. of Germany.

OTHER PUBLICATIONS
Schweissen and Schneiden, vol. 32, 1980, No. 12, pp. 491-495.
Elektronik, Heft. 26, 1979, pp. 23-29.

*Primary Examiner*—Clifford C. Shaw
*Attorney, Agent, or Firm*—Notaro & Michalos

[57] ABSTRACT

A process and a device for automatic determination of parameters for process control systems with unknown transfer behavior are useful for controlling special technical processes in which a functional relationship between process input and process output variables is unknown, at least in parts, while maintaining the properties of the output variables (target functions) within certain acceptable limits. To this end, measured values obtained by the process are subjected to statistical analysis from which control parameters such as theoretical value functions and weighting factors are derived automatically and incorporated in a universally applicable control specification. The control specification is used to determine the control parameter. Adaptation to different processes as well as suitability tests for various control parameters for process control can be carried out comparatively simply using predetermined calculation procedures, conversion factors or the like.

6 Claims, 6 Drawing Sheets

Fig. 2 Block circuit diagram of the welding device with control and regulation devices

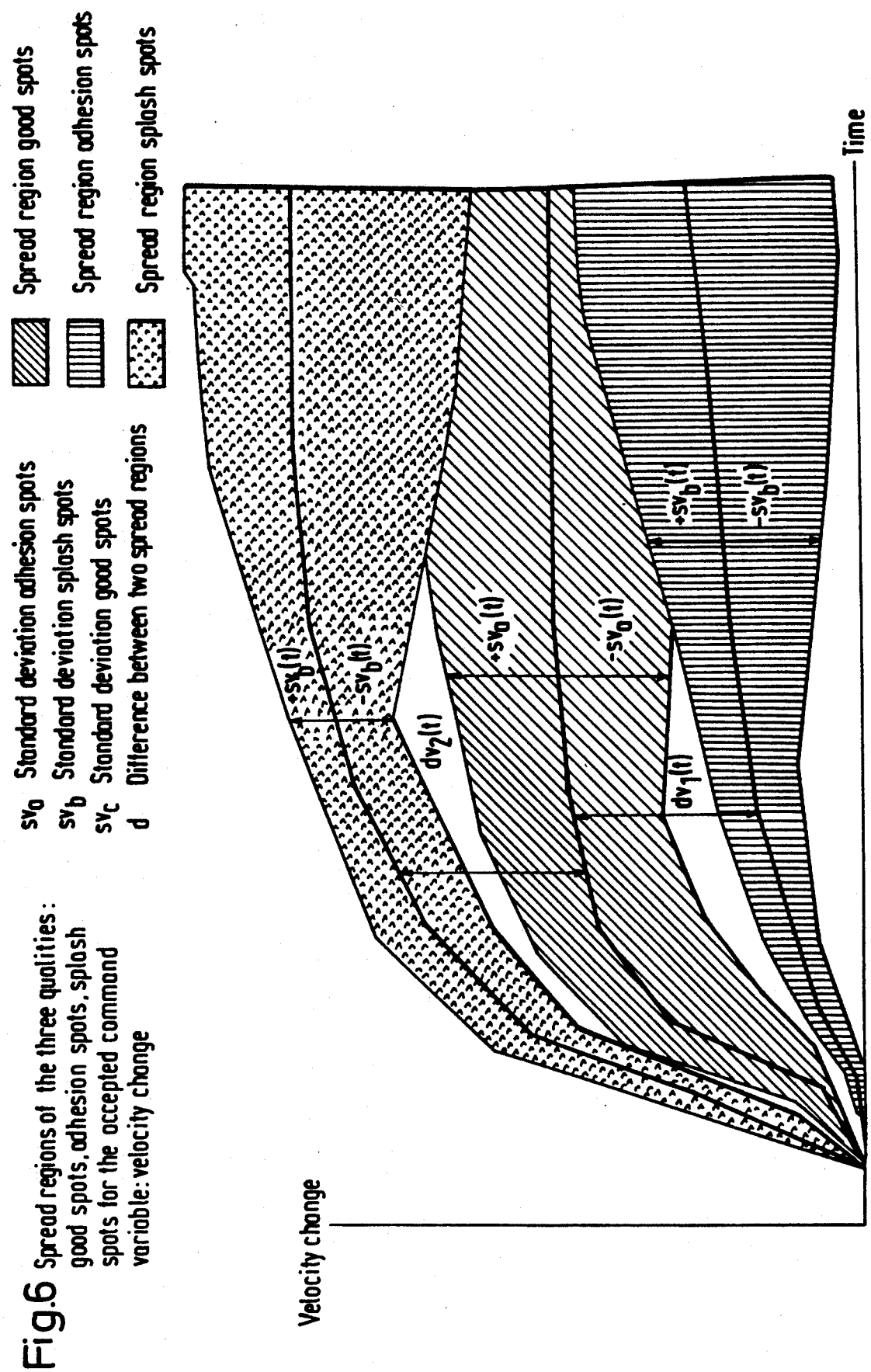

PROCESS AND DEVICE FOR AUTOMATIC DETERMINATION OF PARAMETERS FOR PROCESS CONTROL SYSTEMS WITH UNKNOWN TRANSFER BEHAVIOR, IN PARTICULAR FOR PROCESS CONTROL SYSTEMS FOR RESISTANCE SPOT WELDING

FIELD AND BACKGROUND OF THE INVENTION

The invention relates to a process regulating system as well as a method for carrying out the process.

It is known to utilize, in process regulation systems for ensuring the quality of resistance welding connections, a substitution variable as the command variable, since the parameter which is actually of interest, the spot diameter, cannot be monitored during the welding (Publication "Schweissen und Schneiden", Vol. 32, (1980), No. 12, pages 491 to 495).

A process is also known regulating spot welding (See German patent document DE-OS 37 11 771) in which the mechanical and/or electrical process parameters given for the welding process are monitored during welding and each change of the process parameter within the welding process is fine tunable via several manipulated variables. The welding area is, to this end, subdivided into several areas for regulation, wherein to each of these areas an evaluation scheme is assigned. The trace of the curve for different materials and dimensions is determined on the basis of actual structural parts and is stored.

If a mathematical-physical model of the process cannot be formulated, from which the command variables and other variables of the regulation system can be determined, often the only alternatives are to use either:

a process control in which the control parameters for achieving the target function are optimized and interference influences on the process are either prevented through suitable measures or are compensated for; or a process regulation with a command variable which describes the target function only insufficiently and consequently can only conditionally compensate for interferences and erroneous process runs.

The invention provides a process, and a device for carrying it out, with which for example the special technical processes in which a functional connection between process input and output parameters parameters is at least in part unknown, while maintaining given limits on the characteristics of the output parameters (target function).

Characteristics of processes in which a functional connection between process input and output parameters is at least in part unknown, are that in the process (for example in a machine or reactor) variable input parameters, i.e. which are changeable from the outside, are entered through which the process can be influenced, interference parameters act upon the process whose occurrence and effects on the process are not predictable, and the result of the process are one or several output parameters, which are to have particular previously defined properties.

In many cases the target function is a parameter which is not directly measurable so that it cannot be fed back to the process input—in the sense of a "classical" regulating circuit. On the other hand, a target function and measurable physical parameters, which may not necessarily be output parameters, often have no unique correlation so that the problem resides in defining one or several command variables for process regulation which permit a sufficiently accurate description of the state or the course of the process.

The starting point of the invention is the structure of a process regulation system with one or several manipulated variables and several command variables. The command variables are derived from the measurable process parameters. These derivations have the goal of reducing the information content of the measuring signals in the sense of a characteristic extraction.

The regulation takes place for each manipulated variable according to an estimated regulation rule.

Measured variables and the derivations herefrom (command variables) which are present as calculation rules, cannot be estimated and must be tailored to the particular type of process. Furthermore, it is assumed that the process is in principle repeatable or proceeds periodically and can be made discrete in time.

The conversion factor corresponds to the sensitivity of the system and must be adapted to the particular process. If the system with respect to different command variables reacts with different sensitivity, for each command variable a conversion factor can also be introduced.

In the method according to the invention the nominal values of the command variables and the normalized weighting factors are determined so that therewith, regulation can be carried out directly.

The process data (signal function) to be measured in real time are sensed and stored. Command functions whose progression in time is to describe the course of the process are calculated. These command functions result from the preprocessing of the signal function among which are counted also interlinking of several measured variables (for example: a command function "electrical resistance" in the quotient of signal functions "voltage" and "current"). The calculating rules for the individual command functions are a function of the type of process involved, and are defined by the user of the regulation system. The user can define any number of command functions. It is also possible to select command functions where a relationship with the target function is not expected a priori.

Based on a number of recorded process runs which can take place with an open (process control) or also a closed regulating circuit, an whose signal functions were recorded, command functions can be established and statistically evaluated. The command functions are sorted with respect to their ability for maintaining particular limits of the target function in terms of category according to the result of the process.

Within the scope of an analysis for each individual command function a mean value and an error function are calculated. The error function describes the reproducibility of the command function for different trials whose test results are classified identically. As a result of the analysis the following are available:

the mean value curves of a first category which are supplied directly as nominal values for the individual command variables to the regulation device, the standard deviations of the mean value curves of a second category, and the mean value curves of a third category which, if necessary, is subdivided.

From the mean value curves and their band spreads (standard deviations) the weighting functions for the individual command variables are calculated.

The weighting functions are normalized to values between +1 and −1. According to the normalization the value "0" signifies a place of the identification function which—with respect to the process result to be expected is not significant, while the values +1 and −1 make clear positions of highest significance (=correlation between command variable and target function).

The sign of the individual values of the weighting functions indicates the direction of change of the manipulated variable if a deviation has been detected.

The invention is advantageous in particular in that for a process regulation system with the stated boundary conditions, means are provided with which the regulation parameters, such as nominal-value functions and weighting factors, can be determined automatically and wherein diverse intervention options for user flexibility is largely maintained to make possible individual adaptation to different technical processes.

Sensors of the device according to the invention can be optical, chemical and/or electrical sensors for optical, electrical, mechanical or material properties such as concentration, density and the like.

Command variables for which over the entire process time only small weighting factors can be determined, are not suitable for process regulation. They must therefore be selected out. The limit for such a selection is based on whether or not other suitable command variables exist or whether in particular process stages, a regulation can be dispensed with.

Of importance is that in the estimated regulating rule or equation of the regulation device, the current values of the identification functions are entered as actual values, and that mean value functions are entered as nominal values. The difference between the values supplies the deviation for each command variable. Since the command variables in comparison with each other and as the related to the time during the process can be of different significance, the deviations are multiplied the associated weighting factors. The sum of the weighted deviations yields the total deviation which with the aid of a process-specific conversion factor, is brought into the order of magnitude of the manipulated variable.

BRIEF DESCRIPTION OF THE DRAWINGS

The invention is now explained in detail in conjunction with the drawings wherein:

FIG. 6 is a diagram which represents the spread regions of the three qualities good spots, adhesion spots, and splash spots, for the velocity change as, the accepted command variable.

DESCRIPTION OF THE PREFERRED EMBODIMENTS

Figure 1:
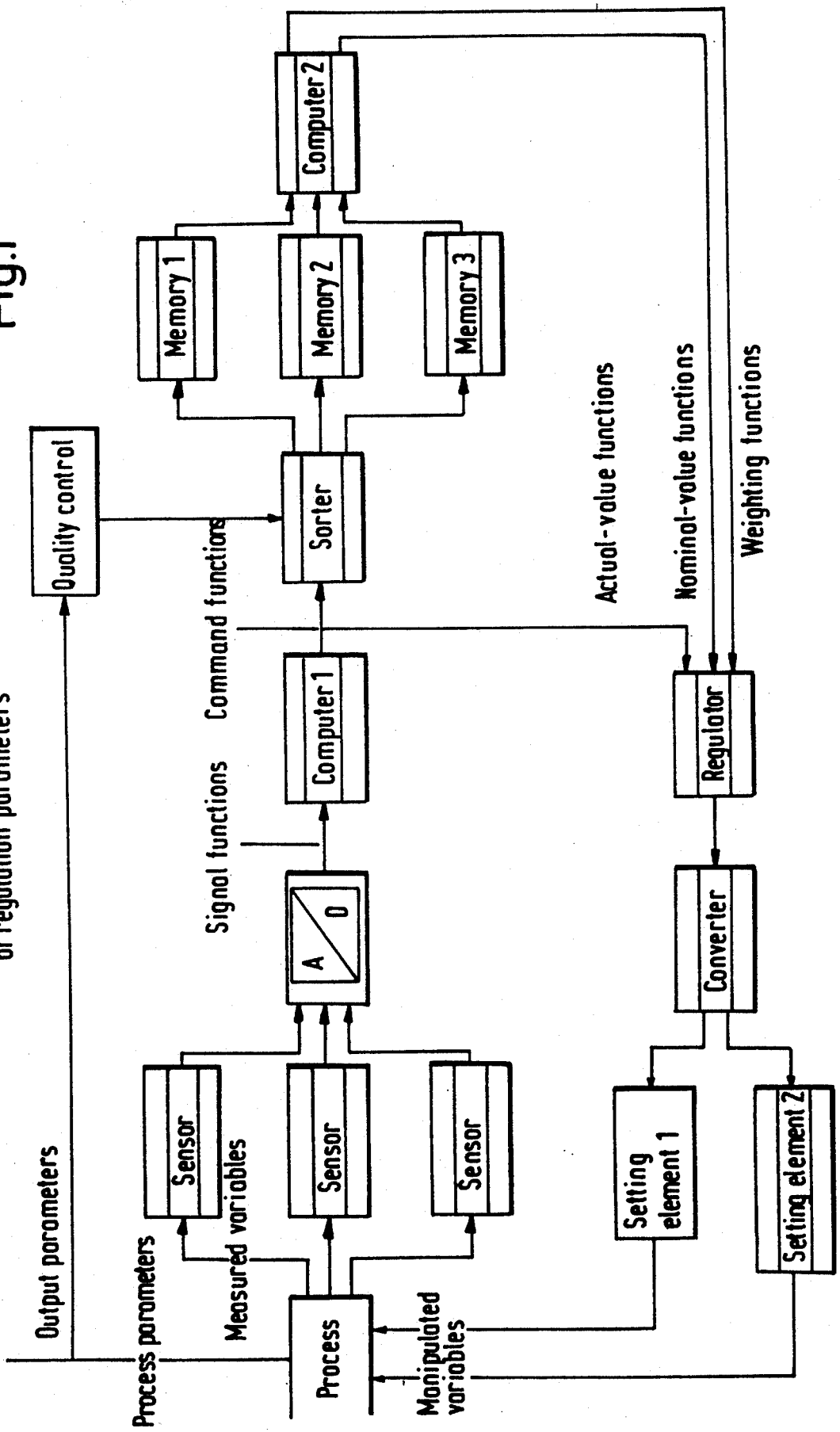
FIG. 1 is a block circuit diagram of an embodiment of the device according to the invention for the automatic determination of regulation parameters.
Figure 2:
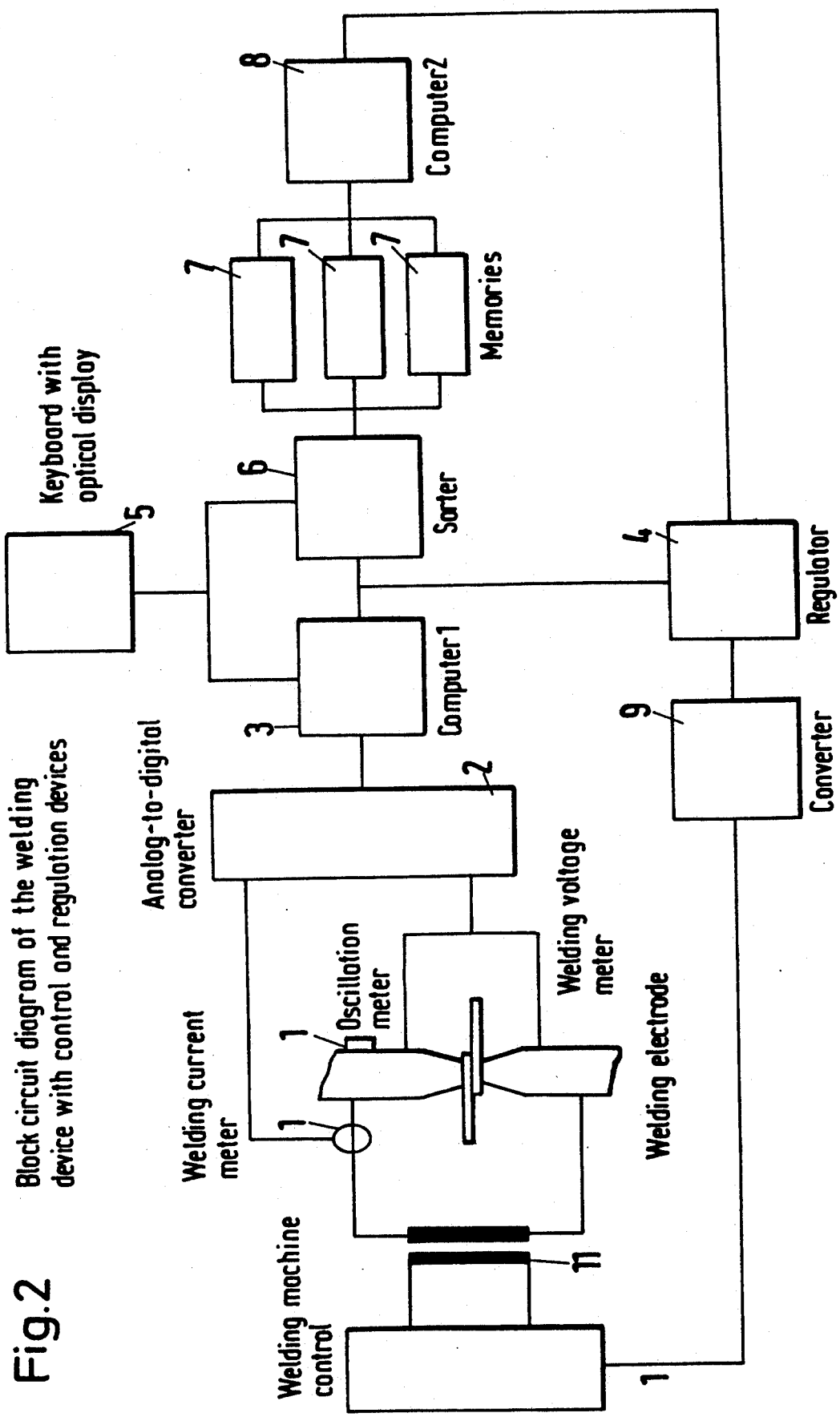
FIG. 2 is a block circuit diagram of a welding device with control and regulation devices for the automatic determination of regulation parameters according to the invention.

Referring to the block circuit diagrams of FIGS. 1 and 2, automatic parameter determination for the regulation of process at the left in FIG., e.g. a welding process system with unknown dynamic system behaviour starts by sensing measured variables from the process at three sensors 1 and supplying the sensor signals to an analog-to-digital converter 2 in which the detected signals are converted for a first computer 3 into readable signal functions. In the first computer 3 the command functions are established from the measured signals and supplied to a sorter 6 coupled to a quality control device 5. In the first computer 3, it is possible to change the calculation rules for the command functions. Thereby it becomes possible, for one, to examine any given process and, for another, to test with respect to one process the most diverse variants of command variables in terms of meaningfulness. If the signals converted by the analog-to-digital converter are stored, the same process can be simulated with different command variables.

In the quality test the results of the production process are determined. These results are divided into categories (for example too little energy application, normal energy application, too much energy application). The command functions are sorted in conjunction with these categories.

The sorter 6 passes on the command functions sorted according to qualities to memories 7 whose number (in the present example three) depends on the necessary quality differentiations.

A second computer 8 is connected at the output side with the input of a regulation device 4 which regulates the process according to an estimated regulation equation and accepts from the first computer 3 the command functions as input parameters and from the second computer 8 the nominal—value functions and the weighting functions for the individual command functions at the input side.

The regulation device 4 is succeeded by a converter 9 by which the regulation results are converted into signals (for example particular voltage values) for individual setting elements following the converter 9.

The setting elements 10 effect according to the regulation result the process so that the target parameter of the process can be achieved.

The block circuit diagram according to FIG. 2 illustrates clearly the process according to the invention or the implementation of the arrangement for carrying out the process using a welding process as an example.

The sensing system is a voltage tap for measuring the electrode voltage, a toroid with an associated converter for determining the welding current, and an acceleration sensor for determining the electrode motion.

In the first computer 3 herefrom the ohmic resistance across the electrodes and the electrode velocity are calculated as command functions.

The quality test in the quality control 5 takes place by separating the welding spots. From the strength, and from the information whether or not during the welding a splash was generated, is derived the division into qualities as explained in connection with FIGS. 5 and 6.

The command functions are stored and sorted by the sorter 6 according to qualities. In the simplest case trials are carried out in which sequentially always a particular result quality is achieved and subsequently stored.

Memories 7 are for example formed by data disks or electronic storage media.

In the second computer 8 the data in the particular memory cells is used to find the mean values, the standard deviations, and subsequently the command functions with the associated weighting functions are determined according to the process explained in the following, and specifically from the mean values of the good welds the nominal presetting for the trace of the resistance and the trace of the velocity.

The regulation device 4 comprises in this case a computer which calculates the regulation equation and outputs a digital setting value for the phase control of the current adjustment of the welding transformer 11.

The setting element 10 is the phase control of the welding transformer 11.

Figure 3:
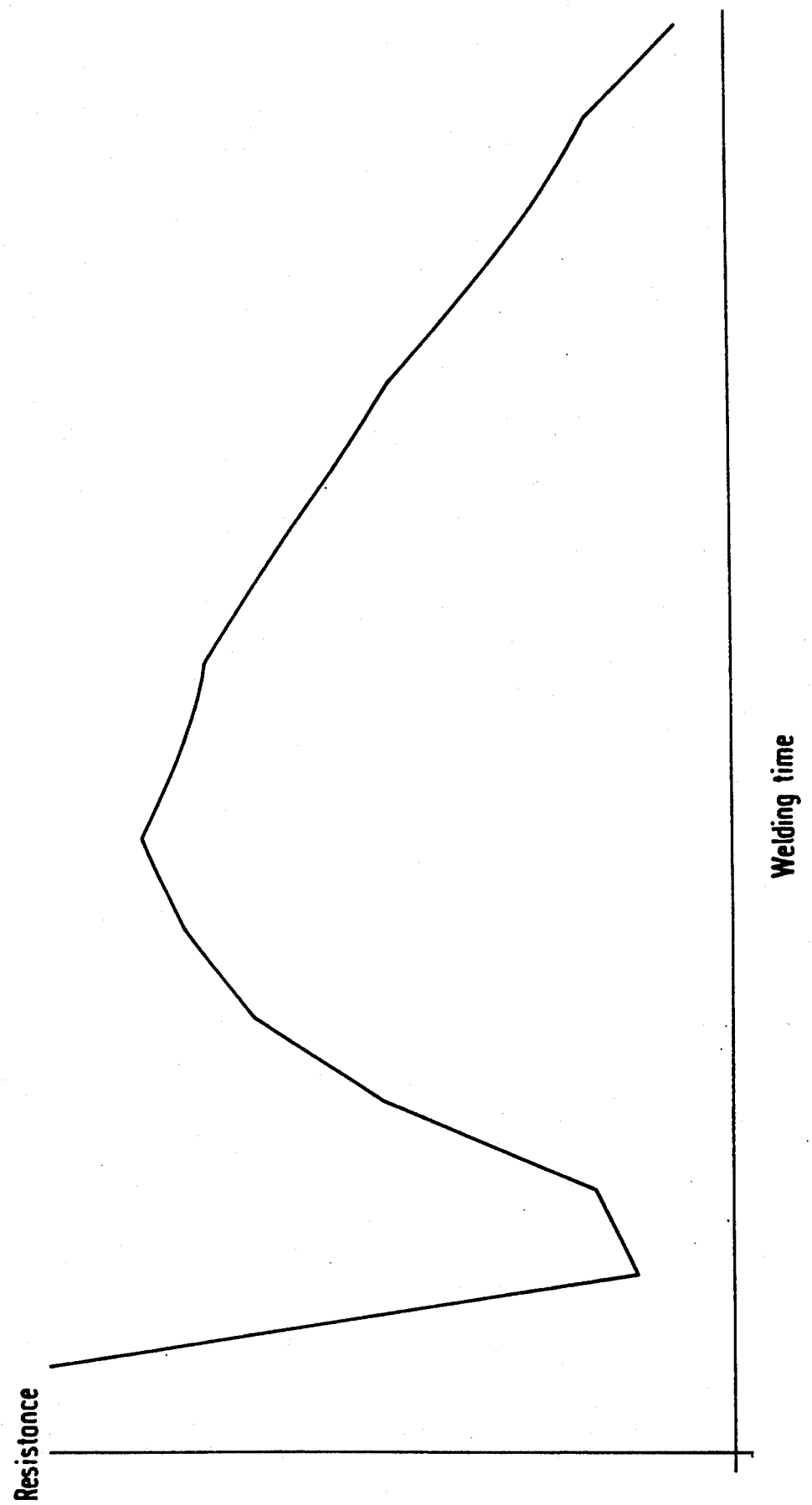
FIG. 3 is a diagram showing a typical trace of the ohmic resistance across the welding electrodes.
Figure 4:
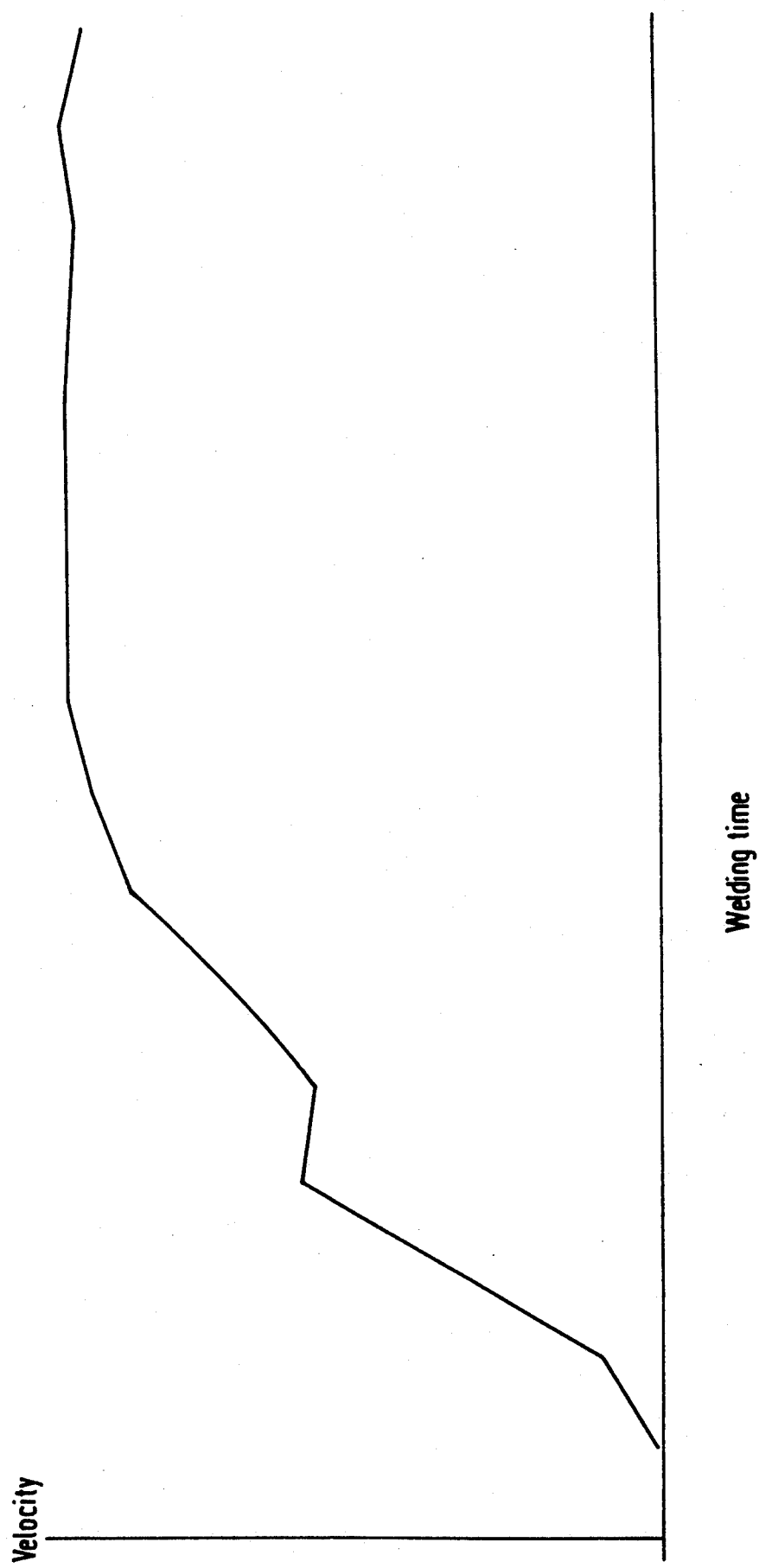
FIG. 4 is a diagram showing the velocity trace of the electrode motion at a spot welding tong.

In FIGS. 3 and 4 a typical trace of the ohmic resistance for the welding electrodes or the trace of the velocity of the electrode motion at a spot welding tong is depicted.

With respect to the process regulation system for resistance spot welding it is assumed that in principle the change of the ohmic material resistance across the welding spot and the oscillation velocity of the welding electrodes caused by the thermal expansion of the material are suitable as command variables. The following embodiments, however, are only used as examples and the stated results are not suitable for an actual regulation of the spot welding process.

The welding time in the selected example is 160 ms. Welding takes place with 50 Hz ac. FIG. 3 shows a typical resistance trace (resistance mean value per 10 ms = one current halfwave as a function of the welding time). FIG. 4 shows a typical trace of the oscillation velocity of the welding electrodes over the welding time (here too the mean values per 10 ms = one current halfwave). With a measuring or computing system such command variables are now sensed for a multiplicity of weldings. Subsequently quality tests of all welded spots are carried out. Here two different criteria of spot evaluation (determination of the target function) exist:

1. Division into
   a) the welding spot does not have sufficient strength, poor quality (adhesion spot).
   b) The welding spot has sufficient strength, good quality (good spot).
2. Division into
   a) The welding spot does not have sufficient strength, too little energy was introduced into the welding spot (adhesion spot).
   b) The welding spot has sufficient strength, but too much energy was introduced into the welding spot so that splashes were generated (splash spot).
   c) The welding spot has sufficient strength. But no splashes originated (good spot).

Comparable differentiations of the target function are also conceivable with other processes. For both differentiations of the target function the described process is applicable.

After the differentiations have been made the mean values with the associated standard deviations are calculated from all command variables of a quality (adhesion spot, good spot or splash spot).

$$Rj = \frac{1}{n} \sum_{i=1}^{n} Rij \quad j = 1 \ldots 16$$

$R$ - mean value of resistance change value of a quality
$j$ - current halfwave

-continued $$srj = \sqrt{\frac{1}{n-1} \sum_{i=1}^{n} (Rij - Rj)^2}$$

$sr$ - standard deviation of resistance change value of a quality
$j$ - current halfwave $$vj = \frac{1}{n} \sum_{i=1}^{n} vij \quad j = 1 \ldots 16$$

$v$ - mean value of velocity change values of a quality
$j$ - current halfwave $$svj = \sqrt{\frac{1}{n-1} \sum_{i=1}^{n} (vij - vj)^2}$$

Figure 5:
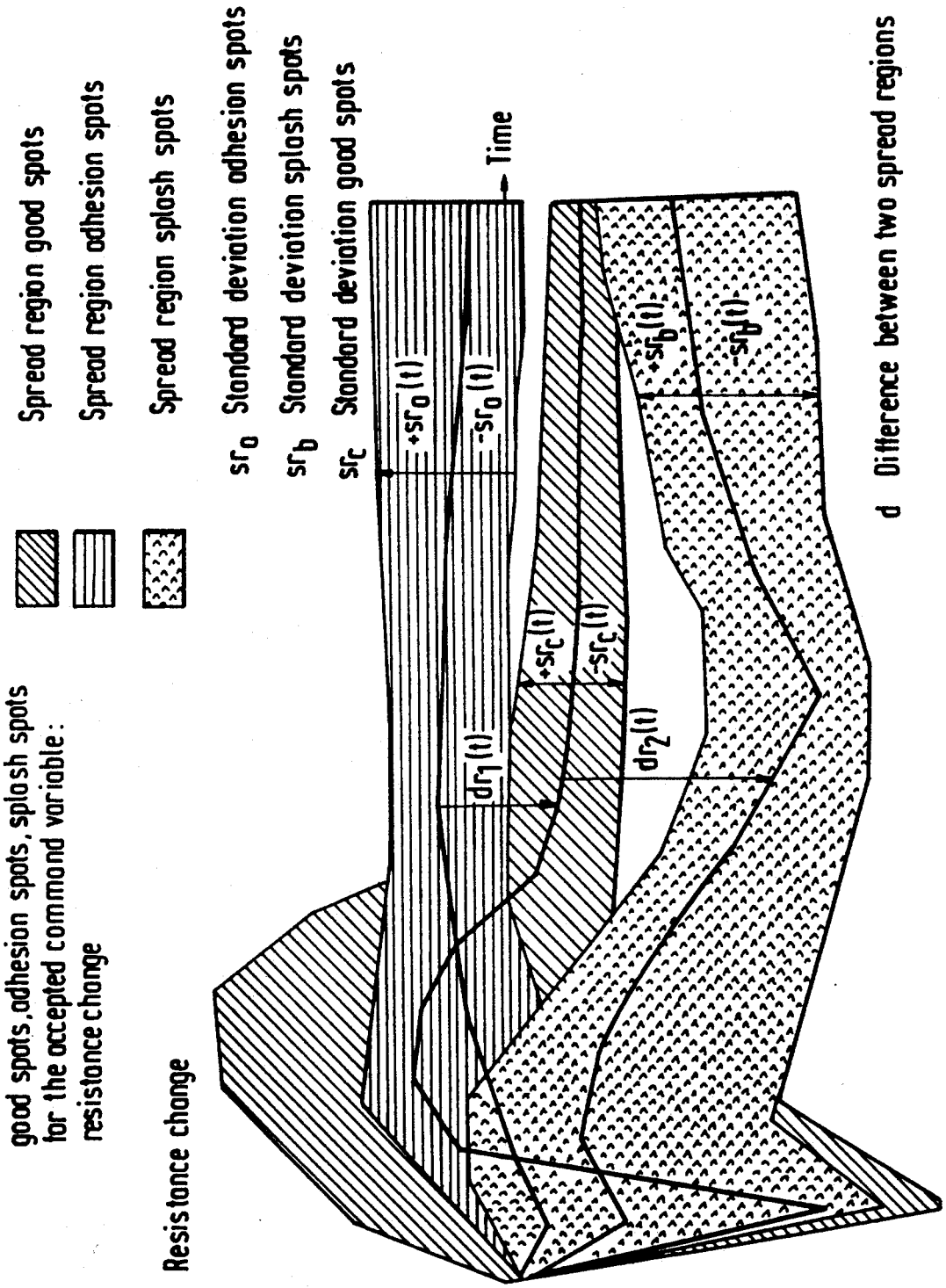
FIG. 5 is a diagram which represents the spread regions of three qualities, good spots, adhesive spots, and splash spots, for the resistance change as the accepted command variable.

$sv$ - standard deviation of velocity change value of a quality
$j$ - current halfwave With the calculated values for each quality a mean value curve and a spread area (all points within the area mean value plus standard deviation and mean value minus standard deviation) of the resistance change and the velocity change (i.e. the accepted command variables) over time can be plotted (FIGS. 5 and 6). It is apparent that if the spread areas of the resistance change differ markedly for the individual qualities, a high significance of the resistance change with respect to the target function is present. In the other case if the spread areas partially or completely overlap this significance is less or not at all present. For each time segment the spread areas of the individual qualities have different distances with respect to one another so that the significance varies in the course of the process time. Likewise, the separation between adhesion spots and good spots or good spots and splash spots are different. It may happen that with the selected command variable (in the example the resistance change) it will hardly be possible to differentiate splash spots from good spots, whereas adhesion spots can be very readily differentiated from good spots. The same applies for the velocity change (i.e. for all further possible command variables).

The weighting factors are calculated as functions of the parameters occurring in the spread bands. In the differentiation into three qualities, apart from the amounts of the weighting factors, their sign changes in the course of the process time are also determined. The user must determine the sign only at one freely selectable process time from the physical given parameters. It is herein of advantage if the quality differentiations are made so that the three qualities can be assigned to three directions of the manipulated variable. The regulation device 4 regulates for example the energy introduction, therefore the differentiation into too much, too little and correct energy supply. In the differentiation into only two qualities the automatic sign determination is not possible.

The weighting factors can be calculated according to the following fundamental rule: $d_1(t)$ is the difference between the mean values of a selected command variable $F_j(t)$ (in our example $\underline{R}_j$ and $\underline{y}_j$, see FIGS. 5 and 6) of the quality $\underline{a}$ (adhesion spots) minus a quality $\underline{c}$ (good spots), $d_2(t)$ is the corresponding difference of the quality $c$ (good spots) from the quality $b$ (splash spots), $(d_{1R}(t) = \underline{R}_a(t) - \underline{R}_c(t)$, analogous for $\underline{v}$).

If the signs of $d_1$ and $d_2$ differ, i.e. both negative spread bands (adhesion and splash spots) are on one side with respect to the positive spread band (good spots) then the weighting factor W(t), for the case that both other spread bands are assigned to qualities which would yield a negative regulating result, has the value 0.

If $d_1$ and $d_2$ change their signs the weighting factor also changes its sign. In our example the sign can be calculated according to:

$$W_f(t)/|W_f(t)| = dr_1(t)/|dr_1(t)| = dr_2(t)/|dr_2(t)| \text{ and}$$

$$W_f(t)/|W_f(t)| = dv_1(t)/|dv_1(t)| = -dv_2(t)/|dv_2(t)|;$$

$$d, W <> 0.$$

For all further cases an evaluation scheme can be set up. First two evaluation numbers Q for each command variables can be calculated (cf. FIGS. 5 and 6).

$$Q_{ac} = \frac{|d_1(t)| - [S_{R_c}(t) - S_a(t)]}{|d_1(t)|}$$

$$Q_{bc} = \frac{|d_2(t)| - [S_{R_c}(t) - S_b(t)]}{|d_2(t)|}$$

Subsequently for each evaluation number the following consideration is carried out:

$$d_1(t), d_2(t) = 0 \rightarrow |W_1(t)| = 0$$

Spread regions are within one another.

$$Q_{ac}, Q_{bc} \begin{cases} > = \frac{1}{2} \rightarrow \\ |W_1(t)| = 1 \\ (> = \text{upper} \\ \text{limit } G_o \rightarrow |W_f(t)| = 1). \end{cases}$$ Spread regions have a difference from one another which is greater than the mean standard deviation.

$$\begin{cases} = 0 \rightarrow |W_1(t)| < 1 \\ = -1 \end{cases}$$ Spread regions touch one another. Spread regions overlap precisely to one half of the mean region width.

$$\begin{cases} < = - > \rightarrow \\ |W_1(t)| = 0 \\ (< = \text{lower} \\ \text{limit } G_u \rightarrow |W_f(t)| = 0). \end{cases}$$ Spread regions overlap to ⅔ of the mean band spread.

After simple proportionality calculation for the weighting factor is obtained:

$$|W_1(t)| = 1/(G_o - G_u)^*Q(t) - G_u/(G_o - G_u)$$
$$G_u < = Q(t) < = G_o$$

$$|W_1(t)| = 1, \quad Q > G_o$$

$$|W_1(t)| = 0, \quad Q < G_u$$

In the case of substitution of $Q_{ac}$ and $Q_{bc}$ different weighing factors result. If both quality differentiations are of equal importance the smaller weighting factor must be used.

In the other case the weighting factor calculated for the more important differentiation is used. In the present example it is more important to avoid adhesion spots than splash spots. Therefore here the weighting factor calculated from the differentiation adhesion spots, good spots is used.

In specific regulation devices it is conceivable to shift the limits $G_u$ and $G_o$. Here it can also be meaningful to replace the linear dependence by an exponential one. This will be necessary in the case of strongly nonlinear regulation paths which cannot be dealt with by the simple method.

Another feature of the invention is the method wherein the nominal value functions and the weighing function of the command variables are entered into the following estimated regulation rule for regulation of the process:

$$dS(t) = \sum_{i=1}^{n} U_i \cdot [(F_{soll,i}(t) - F_{ist,i}(t)) \cdot W_i(t)]$$

wherein:
dS(t) is a change of the command variable between two regulation interventions;
U is a conversion factor depending on a particular process;
F is a command variable;
W is a normalized weighing function
t is continuous or discrete process time;
i is an index of an ith command variables;
n is a number of command variables;
soll is a given value; and
ist is an actual measured value or value determined from measurements.

To create the diagrams of FIGS. 5 and 6 two or three overlaying transparent films that are layable one over the other and have corresponding coordinate systems, are used to plot diagrams containing representations of the command variable over time and are of regions which are enclosed by mean values of the command variables. Addition and subtraction of the mean values and standard deviations of the command variables are also plotted for the individual categories and the films are laid one over the other to indicate where weighing functions coincide, the regions being assumed to have value zero and where regions do not coincide, assume maximum values. In the case of partial overlapping regions assume intermediate values wherein the sign of the values of the weighing functions is determined at a free selectable process time and a sign change of the values of the weighing function results from a change of direction of a distance vector between the regions.

We claim:
1. A method of determining nominal value functions for a plurality of command variables to be applied as actual values to a regulator for controlling a process over time, which process produces a plurality of output parameters to be maintained within selected limits, each command variable falling into one of at most three categories including, category c where the command variable produces an optimum process result, category a where the command variable produces too small a result and represents a negative deviation from the optimum result and b where the command variable produces too large a result and represents a positive deviation from the optimum result, the method comprising:
applying the command variable to the regulator to control the process and produce the output parameters over time;
sorting and storing each command variable over time into one of the categories;
finding a mean value function $F_j(t)$ over time for the command variables stored in each category;

finding standard deviations $S_c(t)$, $S_b(t)$ and $S_a(t)$ over time for the command variables stored in each category;

applying the mean value function of the category c command variable to the regulator as the nominal value function for that command variable;

inputting the mean value and standard deviation functions of all categories into a computer for determining weighing functions for each command variable according to computing rules as follows:

determining for each command variable, two evaluation functions $Q_i(t)$ as:

$$Q_{ac} = \frac{|d_1(t)| - [S_c(t) + S_a(t)]}{|d_1(t)|}$$

$$Q_{bc} = \frac{|d_2(t)| - [S_c(t) + S_b(t)]}{|d_2(t)|}$$

wherein $d_1(t)$ and $d_2(t)$ are respective distances between mean value functions of categories a and b from category c;

determining for both evaluation functions amounts of each weighing function $W_i(t)$ as:

$|W_i(t)| = 1/(G_o - G_u) \cdot Q_i(t) - G_u/(G_o - G_u)$, $G_u < Q_i(t) < G_o$
$|W_i(t)| = 1/(G_o - G_u) \cdot Q_i(t) - G_u/(G_o - G_u)$, $Q_i(t) > G_o$
$|W_i(t)| = 0/(G_o - G_u) \cdot Q_i(t) - G_u/(G_o - G_u)$, $Q_i(t) < G_u$ wherein $G_o$ is an upper limit of $Q_i(t)$; $G_u$ is a lower limit of $Q_i(t)$ and i is ac or bc;

selecting a weighing function for each command variable which, in terms of amount, is least at everypoint in time, over the time of the process;

determining a sign of each weighing function according to:

$$\frac{W_i(t)}{|W_i(t)|} = \frac{d_1(t)}{|d_1(t)|} = \frac{d_2(t)}{|d_2(t)|}$$

wherein at $\frac{d_1(t)}{|d_1(t)|}$ not equal to $\frac{d_2(t)}{|d_2(t)|}$ $W_i(t)$ is zero; and using the weighing functions for each command variable to produce a nominal value function for each command variable for application to the regulator.

2. A method according to claim 1, wherein the nominal value functions and the weighing functions of the command variables are entered into the following estimated regulation rule for regulation of the process:

$$dS(t) = \sum_{i=1}^{n} U_i \cdot [(F_{soll,i}(t) - F_{ist,i}(t)) \cdot W_i(t)]$$

wherein:

dS(t) is a change of the command variable between two regulation interventions;

U is a conversion factor depending on a particular process;

F is a command variable;

W is a normalized weighing function t is continuous or discrete process time;

i is an index of an ith command variables;

n is a number of command variables;

soll is a given value; and ist is an actual measured value or value determined from measurements.

3. A method according to claim 1, in which the process is resistance spot welding, the command variables being at least one of a change of an ohmic material resistance across a welding spot and an oscillation velocity of welding electrodes caused by thermal expansion of the material.

4. A method according to claim 1, including plotting diagrams onto plural transparent films which are layable one over the other, the diagrams having coordinates coinciding and containing representations of the command variables over time and of regions which are enclosed by mean values of the command variables, addition and subtraction of the mean values, and standard deviations of the command variables in the individual categories, laying the diagrams one over the other wherein the weighing functions with coincidence of the regions are given the value zero, and in the event the regions do not coincide, the weighing functions are given a maximum value, and in the case of partially overlapping regions the weighing functions are given intermediate values, the sign of the values of the weighing functions being defined at a freely selectable process time and a sign change of the values of the weighing functions resulting from a change of direction of a distance vector d between the regions on the overlapping diagrams.

5. An apparatus for determining and using nominal value functions for a plurality of command variables to be applied as actual values for controlling a process over time, which process produces a plurality of output parameters to be maintained within selected limits, each command variable falling into one of at most three categories including, category c where the command variable produces an optimum process result, category a where the command variable produces too small a result and represents a negative deviation from the optimum result, and b where the command variable produces too large a result and represents a positive deviation from the optimum result, the apparatus comprising:

a first computer (3) for receiving the output parameters and for processing the command variables for use in controlling the process;

a process regulator (4) for receiving the command variables from the first computer to control the process over time;

quality control means (5) for determining the category of each command variable;

a sorter (6) connected to the first computer and to the quality control means (5) for sorting each command variable over time into one of the categories;

memory means (7) connected to the sorter for separately storing command variables into each category;

a second computer (8) connected to the memory means for finding a mean value function $F_i(t)$ over time for the command variables stored in each category and for finding standard deviations $S_c(t)$, $S_b(t)$ and $S_a(t)$ over time for the command variables stored in each category;

the second computer being connected to the regulator for applying the mean value function of the category c command variables to the regulator as the nominal value function for these command variables;

the second computer performing the steps of using the mean value and standard deviation functions of all categories for each command variable according to computing rules as follows:

determining for each command variable, two evaluation functions $Q_1(t)$ as:

$$Q_{ac} = \frac{|d_1(t)| - [S_c(t) + S_a(t)]}{|d_1(t)|}$$

$$Q_{bc} = \frac{|d_2(t)| - [S_c(t) + S_b(t)]}{|d_2(t)|}$$

wherein $d_1(t)$ and $d_2(t)$ are respective distances between mean value functions of categories a and b from category c;

determining for both evaluation functions amounts of each weighing function $W_i(t)$ as:

$|W_i(t)| = 1/(G_o - G_u) \cdot Q_i(t) - G_u/(G_o - G_u), G_u < Q_i(t) < G_o$
$|W_i(t)| = 1/(G_o - G_u) \cdot Q_i(t) - G_u/(G_o - G_u), Q_i(t) > G_o$
$|W_i(t)| = 0/(G_o - G_u) \cdot Q_i(t) - G_u/(G_o - G_u), Q_i(t) < G_u$ wherein $G_o$ is an upper limit of $Q_i(t)$; $G_u$ is a lower limit of $Q_i(t)$ and i is ac or bc;

selecting a weighing function for each command variable which, in terms of amount, is least at every point in time, over the time of the process;

determining a sign of each weighing function according to:

$$\frac{W_i(t)}{|W_i(t)|} = \frac{d_1(t)}{|d_1(t)|} = \frac{d_2(t)}{|d_2(t)|}$$

wherein at $\frac{d_1(t)}{|d_1(t)|}$ not equal to $\frac{d_2(t)}{|d_2(t)|}$ $W_i(t)$ is zero; and using the weighing functions for each command variable to produce a nominal value function for each command variable for application to the regulator.

6. An apparatus according to claim 5, wherein the quality control means comprises a display device with keyboard.

* * * * *